United States Patent [19]

Shimizu

[11] Patent Number: 5,181,738
[45] Date of Patent: Jan. 26, 1993

[54] SEAT BELT WITH AN AUTOMATIC UNLOCKING DEVICE

[76] Inventor: Shigeichi Shimizu, 6-26-14 Yutakacho, Shinagawa-Ku, Tokyo, Japan

[21] Appl. No.: 692,423

[22] Filed: Apr. 29, 1991

[51] Int. Cl.⁵ .............................................. B60R 21/00
[52] U.S. Cl. ..................................... 280/801; 180/282
[58] Field of Search ......................... 180/282; 280/801

[56] References Cited

U.S. PATENT DOCUMENTS

| | | | |
|---|---|---|---|
| 4,678,928 | 7/1987 | Nishimura et al. | 280/801 X |
| 4,815,177 | 3/1989 | MacKew | 280/801 X |

*Primary Examiner*—Richard A. Schacher
*Attorney, Agent, or Firm*—Jordan and Hamburg

[57] ABSTRACT

A seat belt automatic unlocking device includes a seat belt having an end portion with a fitting, a lock box structure which receives the seat belt end portion, and a locking lever movably mounted on the lock box structure between a locked position and an unlocked position. The locking lever engages and locks the fitting when in the locked position, the locking lever disengaging and unlocking the fitting when in the unlocked position to thereby unlock the seat belt. A mounting structure is mounted on a vehicle on which the seat belt automatic unlocking device is used, and a connection connects the mounting structure to the lock box structure. A releasable device is operably connected between the mounting structure and the locking lever and operable between a release position and a non-release position, the releasable device being operable to move the locking lever to its unlocked position when the releaseable device is moved to its release position. The releasable device is movable to the released position when the mounting structure and the lock box structure are moved to a separated position, whereby the releasable device automatically unlocks the fitting to thereby unlock the seat belt after application of a separating force exceeding a predetermined biasing force.

7 Claims, 3 Drawing Sheets

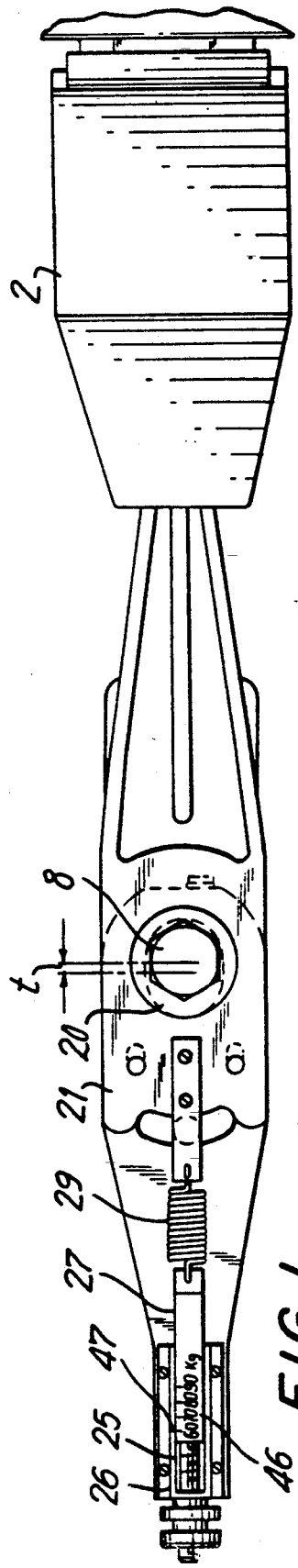
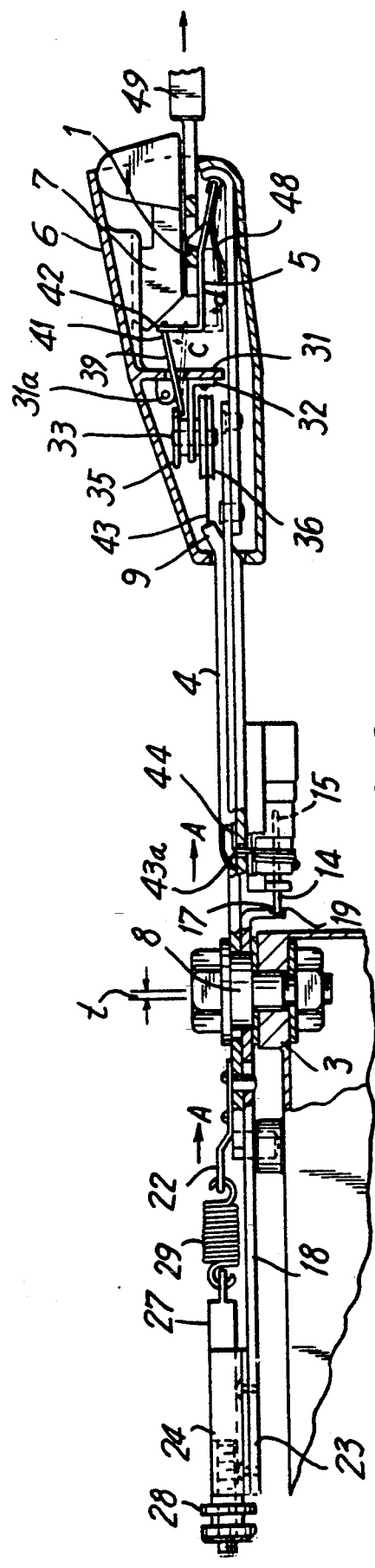
FIG. 1
FIG. 2

SEAT BELT WITH AN AUTOMATIC UNLOCKING DEVICE

The present invention relates to a seat belt with an automatic unlocking device to be mounted on the driver's seat, front-passenger's seat, and rear seats in a passenger car.

BACKGROUND OF THE INVENTION

When a car is involved in a major accident such as a collision, it is usually badly damaged, turns over, or catches fire. The driver or the passengers often sustain serious injuries even when they wear seat belts. In such cases, it takes too much time for them or the rescuing persons to release their seat belts, often resulting in a tragic end.

The present invention provides a seat belt with an automatic unlocking device to be described hereinafter that can solve the above problems.

BRIEF DESCRIPTION OF THE DRAWINGS

FIGS. 1, 2 and 3 are plane, front and bottom views, respectively, of a seat belt with an automatic unlocking device according to the present invention.

DESCRIPTION OF THE PREFERRED EMBODIMENTS

Figure 3:
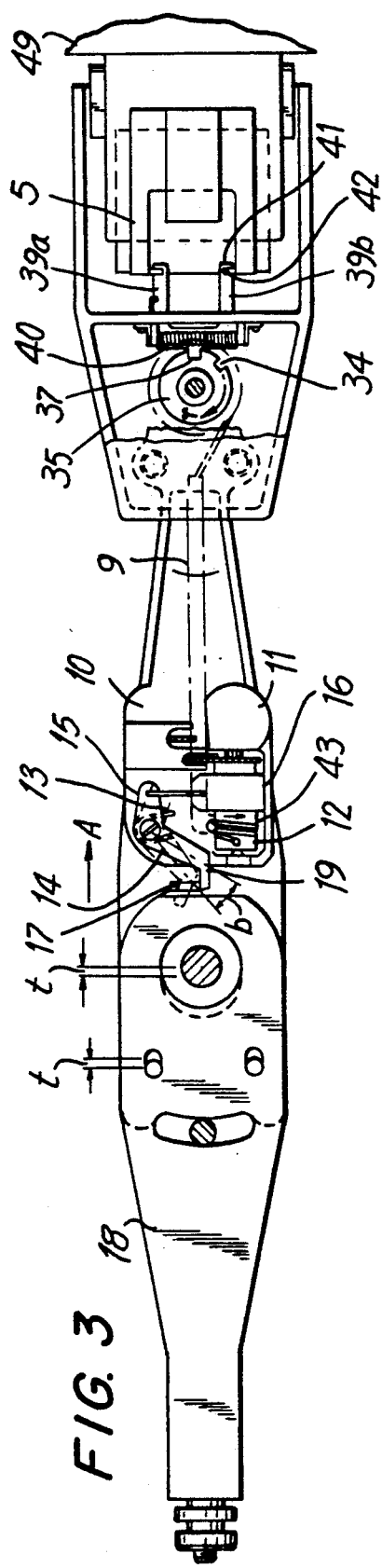

This invention is essentially composed of a fastener (2) substantially formed from a lock box (6) which is provided with a locking lever (5) that freely engages and disengages a metal fitting (1) which is connected to an outer belt (49) wound around the body of a rider and a starting part for automatic unlocking means connected to an inner belt (4), which supports the fastener (2) and is pivotably fitted to the seat (3) through a fitting bolt (8).

The bottom face of the inner belt (4) is attached to a surface plate (10) on which a case (11) containing a spiral spring is fitted. The spring is connected to an interlocked rotatable governor (not shown) and further, to a winding drum (12). The surface plate (10) rotatably mounts a rotary arm (14) and is installed together with a spring (13) and provided with a claw (19) at one end and a protruding arm (15) at its other end. The end of the arm (15) can freely pull out a braking belt (16) wound around a winding drum (12). A base plate (18) is joined with said inner belt (4) by detachably engaging its engaging part (17) with the claw (19) of said rotary arm (14). The base plate (18) is connected to the seat (3) with a fitting bolt (8). To pivotably fit the fitting bolt (8) of the inner belt (4) to the seat (3), the fitting hole (20) has a an elongated shape formed by boring two circular holes with their respective centers on two points separated by a distance (t). While a spring hook (22) is attached to the opposite side (21) of the fastener (2), a guide box (24) with a U-shaped groove is provided at the end (23) of the base plate (18) perpendicular to the axis if the fitting bolt (8). The U-shaped groove (25) of the guide box (24) slides into a tensile body (27) whose rear end portion forms a spiral shaft (26), and a lock-nut (28) is screwed to the tensile body (27). A tension spring (29) is mounted between the body (27) and said spring hook (22).

Figure 5:
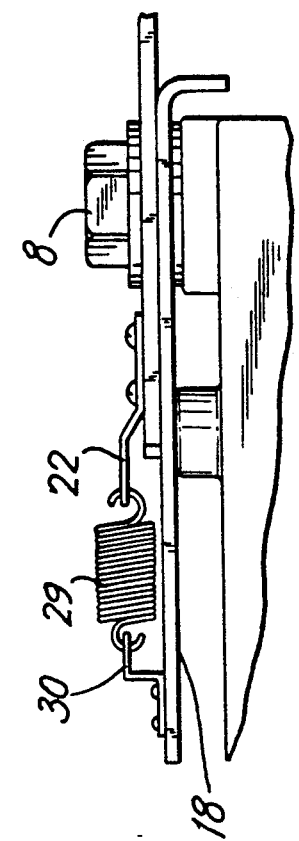
FIGS. 4 and 5 are plane and front views, respectively, of an alternate embodiment with a simplified spring hook.
Figure 4:
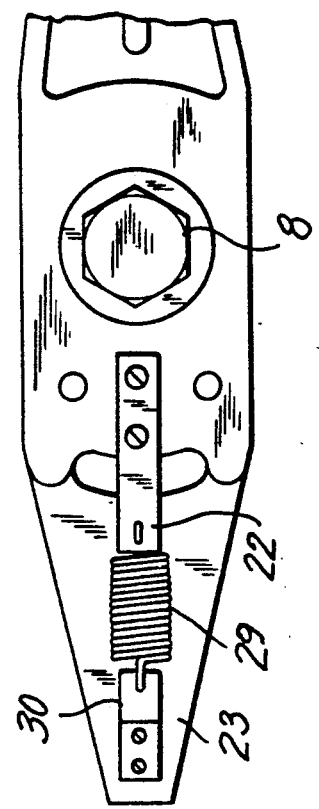

Instead of the configuration including the tensile body (27), the spring (29) can be mounted and made tense between the spring hook (22) and another spring hook (30) installed directly on the end (23) of the base plate (18) as shown in FIGS. 4 and 5.

On the side of the fastener (2), a bearing support (32) is attached to the partition wall (31) hanging down in the interior (7) of the lock box (6) to be rotatably fitted with a shaft (33), on the upper and lower ends of which a rotary plate (35) with a notched recess (34) and a pulley (36) are mounted respectively, as shown in FIGS. 1 and 2.

An unlocking lever (39) is pivotably attached to the partition wall (31) by pivot supports (31a) in such a way as to have an engaging lug (37) on the rear side of the partition (31) and arms (39a, 39b) on the front side that can branch right and left. The lever (39) has a clockwise rotational force exerted by a spiral spring (40) as it is shown in FIG. 2.

The unlocking lever (39) is set in such a way that its engaging lug (37) slides on the back side of the rotary plate (35) and fits into to the notched recess (35), and the tips (41) of the arms (39a, 39b) are engaged with the tips (42) of the locking lever (5).

A rope (43) is wound around the winding drum (12) and extended through a hole (43a) bored in both the surface plate (10) and the inner belt (4) and through a conduit to the pulley (36) in the interior (7) of the fastener (7) and fastened tightly, thus allowing the rotation of the winding drum (12) to pull the rope (43) and to rotate the pulley (36). Thus winding drum (12) and the pulley (36) are linked to each other by the rope (43).

Figure 6:
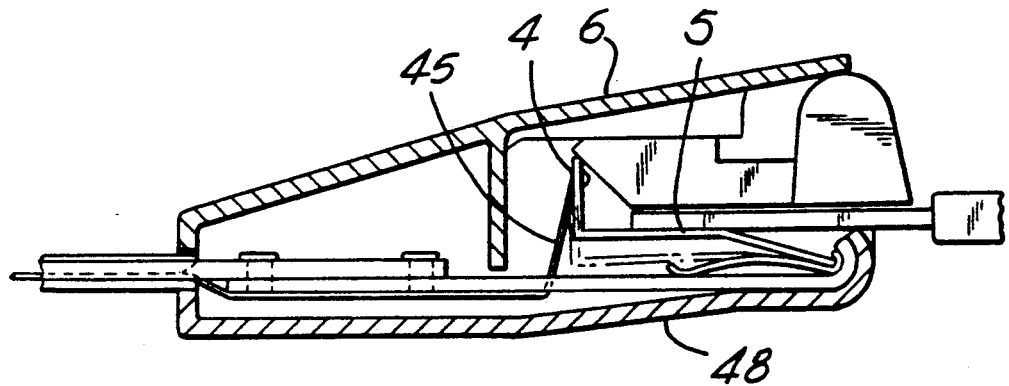
FIGS. 6 and 7 are front and cutaway views, respectively, of a fastener with a simplified interior unlocking structure with FIG. 7 being a bottom view with the bottom lid removed.
Figure 7:
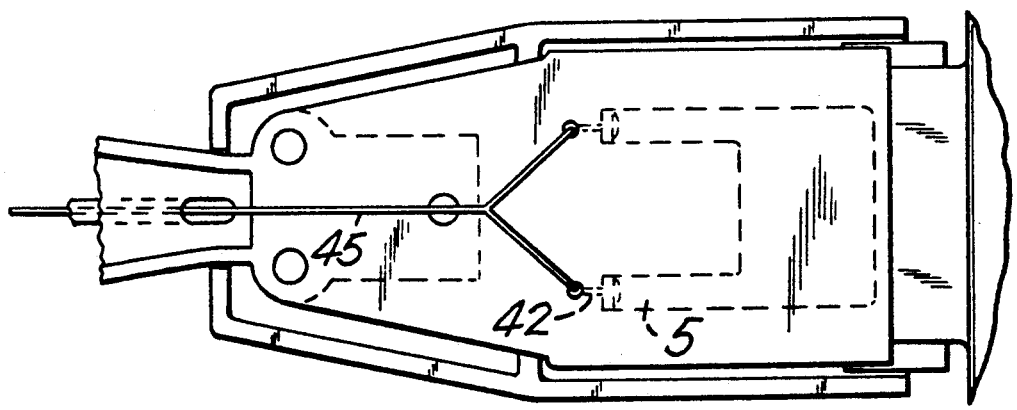

Instead of the pulley (36), rotary plate (35) and unlocking lever (39), another configuration can be used in which the rotation of the winding drum (12) pulls a rope (45) to interlock the locking lever (5) by directly connecting the end of the rope (45) extended from the winding drum (12) to the tip (42) of the locking lever (5) as shown in FIGS. 6 and 7.

With regard to the configurations of the present invention, a method can still be applied according to which the unlocking lever directly releases the seat belt using an impact sensor and a cell in the interior (7) of the fastener (2). Furthermore, another method can be used in which a spiral spring is mounted on the rotary plate (35) to hold a rotational force; a stopper with a weight is usually engaged with the rotary plate (35); and the stopper is released by impact to rotate the rotary plate (35) and unlock the fastener by the restoring force of the spiral spring.

In the above arrangement, the spiral spring in the case (11) is wound to locate the position of the notched recess (34) of the rotary plate (35) at the rear side of the engaging lug (37) of the unlocking lever (39), namely, on the position close to the head of the arrow (n) showing the direction of rotation.

As shown in FIG. 3, the claw (19) of the rotary arm (14) is engaged with an engaging part (17) hanging down from the base plate (18) against the resilient force of the spring (13). If required, the division representing the body weight, e.g. 60 for a man with a weight of 60 kg, on the scale (46) notched along a tensile body (27) as shown in FIG. 1 is set to the mark (47) by turning the lock nut (28).

After the above preliminary adjustment is made, the seat belt is used in the same manner as a conventional seat belt. If a driver or passenger happens to experience a severe crash, a large tensile force is applied to the seat belt, concurrently caused by the heavy impact due to collision and the inertia of the body weight.

In this case, the inner belt (4), subsequent to the fastener (2), is subjected to tensile force between it and the fixed fitting bolt (8), which causes the belt to be pulled in the direction of arrow A against the resilience of the spring (29) and shifted by the length (t).

Then, the rotary arm (14) shifts in the direction of arrow A by the same length, and the claw (19) of the rotary arm (14) is released from the engaging part (17) of the base plate (18) fixed by the fitting bolt (8), and rotated in direction (b) by the recoil force of the spring (13).

At the same time, the protruding arm (15) is also rotated to release the braking belt (16), and the released winding drum (12) is rotated by the recoil force of the spiral spring. As the rope (43) is then unwound, the pulley (36) in the lock box (6) is rotated. At the same time, the rotary plate (35) is rotated, causing the notched recess (34) to rotate in direction (n), roughly making one full turn. At the time, when the recess (34) fits into the protruding part (37) of the unlocking lever (39), the recoil force of the winding spring (40) rotates the unlocking lever (39). Then the tips (41) of the arms (39a, 39b) turn in direction (c) and rotate the unlocking lever (5) against the resilent force of the spring (48) in direction (d), thus releasing the engaging metal fitting (1) and enabling the automatic unlocking of the seat belt.

It is preferable that the above action from the start to the end be completed in about 10 to 15 seconds. The time adjustment is made by the governor of the spiral spring. Otherwise, the adjustment can be made by changing the winding diameter of the winding drum (12) or the effective diameter of the pulley (36).

In FIGS. 6 and 7, unlocking is conducted by directly pulling the locking lever (5) connected to the tip of the rope (45).

According to this invention, a seat belt is automatically unlocked after no danger of secondary collisions exist even after a major collision has occurred. Thus the driver and fellow passengers can escape by themselves and save other victims more easily, and the danger of wearing a seat belt is completely eliminated.

I claim:

1. A seat belt automatic unlocking device comprising a seat belt having an end portion with a fitting, a lock box structure which receives said seat belt end portion, a locking lever movably mounted on said lock box structure between a locked position and an unlocked position, said locking lever engaging and locking said fitting when in said locked position, said locking lever disengaging and unlocking said fitting when in said unlocked position to thereby unlock said seat belt, a mounting structure mounted on a vehicle on which the seat belt automatic unlocking device is used, connecting means connecting said mounting structure to said lock box structure, and releasable means operably connected between said mounting structure and said locking lever and operable between a release position and a non-release position, said releasable means being operable to move said locking lever to its unlocked position when said releasable means is moved to its release position, said releasable means being operable to retain said locking lever in its locked position when said releasable means is in its non-release position, said releasable means comprising a rotatably mounted drum and a rotatably mounted pulley along with a rope means extending between said drum and said pulley, said pulley being rotatable by said rope to a position to effect release of said locking lever to its unlocked position, said connecting means comprising biasing means biasingly maintaining a non-separated position between said mounting structure and said lock box structure, said biasing means permitting relative movement between said mounting structure and said lock box structure from said non-separated position to a separated position upon application of a separating force exceeding a predetermined biasing force to said biasing means, said releasable means being retained in said non-release position when said mounting structure and said lock box structure are in said non-separated position, said releasable means being moved to said released position when said mounting structure and said lock box structure are moved to said separated position, whereby said releasable means automatically unlocks said fitting to thereby unlock said seat belt after application of said separating force exceeding said predetermined biasing force.

2. A seat belt automatic unlocking device according to claim 1, wherein said connecting means comprises a connecting bolt passing through bolt openings in said mounting structure and said lock box structure, at least one of said openings being elongated to permit relative transverse sliding between said one opening and said bolt to permit said relative movement between said mounting structure and said lock box structure between said separated and non-separated positions.

3. A seat belt automatic unlocking device according to claim 1, wherein said rope means is wound around said drum, said releasable means further comprising brake means operable to engage said drum to prevent rotation of said drum, said releasable means further comprising a pivotal brake lever pivotably mounted on said lock box structure and an engagable part mounted on said mounting structure, said engagable part engaging said pivotal brake lever when said mounting structure and said lock box structure are in said non-separated position, said engagable part disengaging from said pivotal brake lever when said mounting structure and said locking structure are in their separated position, said brake lever releasing said brake means when said brake lever is disengaged by said engagable part.

4. A seat belt automatic unlocking device according to claim 1, wherein said releasable means further comprises rotary means rotatably supporting said pulley on said lock box structure, said releasable means further comprising an actuating lever operable to effect movement of said locking lever between its locked and unlocked positions, said actuating lever being actuated by said rotary means.

5. A seat belt automatic unlocking device according to claim 4, wherein said rotary means comprises a disc having a notch, said actuating lever being movable between an actuated position in which said actuating lever engages said notch and an unactuated position in which said actuating lever is disengaged from said notch.

6. A seat belt automatic unlocking device according to claim 5 further comprising biasing means biasing said actuating lever toward said actuated position.

7. A seat belt automatic unlocking device according to claim 6 further comprising spring means biasing said locking lever towardsd its locked position.

* * * * *